United States Patent [19]

Osendorf et al.

[11] Patent Number: 5,290,345
[45] Date of Patent: Mar. 1, 1994

[54] REFILLABLE GAS ADSORPTION BED ASSEMBLY AND COUNTERFLOW ADSORBER MODULE

[75] Inventors: Richard J. Osendorf, West St. Paul; Paul C. Peterson, New Prague; Donald R. Monson, West St. Paul, all of Minn.

[73] Assignee: Donaldson Company, Inc., Minneapolis, Minn.

[21] Appl. No.: 3,804

[22] Filed: Jan. 13, 1993

[51] Int. Cl.$^5$ .............................................. B01D 53/04
[52] U.S. Cl. ............................ 96/129; 55/385.2; 55/418; 55/502; 55/518; 55/528; 96/135; 96/138
[58] Field of Search ............... 55/316, 341.7, 350, 55/385.2, 387, 502, 516, 518, 519, 528

[56] References Cited

U.S. PATENT DOCUMENTS

| 1,577,867 | 3/1926 | Moyer | 55/387 X |
|---|---|---|---|
| 2,055,774 | 9/1936 | Ray | 55/387 |
| 2,080,578 | 5/1937 | Ray | 55/387 X |
| 2,180,119 | 11/1939 | Osterloh et al. | 55/387 |
| 2,593,132 | 4/1952 | Gannon | 55/387 |
| 3,186,149 | 6/1965 | Ayers | 55/387 |
| 3,217,471 | 11/1965 | Silverman | 55/387 X |
| 3,350,860 | 11/1967 | Grassel et al. | 55/387 |
| 3,411,273 | 11/1968 | Duncan et al. | 55/387 |
| 3,434,269 | 3/1969 | Hyatt | 55/502 X |
| 3,577,710 | 5/1971 | Feldman | 55/387 X |
| 3,581,476 | 6/1971 | Rivers | 55/387 |
| 3,630,007 | 12/1971 | Neumann | 55/387 |
| 3,849,092 | 11/1974 | Bakke et al. | 55/502 X |
| 3,853,519 | 12/1974 | York, Jr. | 55/387 |
| 3,912,472 | 10/1975 | Marble | 55/387 X |
| 3,961,920 | 6/1976 | Gilbert | 55/387 |
| 3,964,890 | 6/1976 | Bonn | 55/518 X |
| 4,049,406 | 9/1977 | Rivers | 55/387 X |
| 4,115,082 | 9/1978 | Newell | 55/528 X |
| 4,292,059 | 9/1981 | Kovach | 55/387 X |
| 4,340,402 | 7/1982 | Catron | 55/528 X |
| 4,902,306 | 2/1990 | Burnett et al. | 55/528 X |
| 4,904,288 | 2/1990 | d'Augereau | 55/518 X |
| 5,078,765 | 1/1992 | Schöllhorn et al. | 55/502 X |
| 5,188,646 | 2/1993 | Nolen, Jr. | 55/528 X |

FOREIGN PATENT DOCUMENTS 58-163871  9/1983  Japan ................................ 55/502

*Primary Examiner*—Robert H. Spitzer
*Attorney, Agent, or Firm*—Merchant, Gould, Smith, Edell, Welter & Schmidt

[57] ABSTRACT

The present invention pertains to a refillable gas adsorption bed assembly having a box-like, generally rectangular frame The frame has a pair of oppositely disposed side members and a pair of oppositely disposed end members. There is a first and a second rectangular fine mesh screen mounted within the frame on opposite sides of a filler opening through one of the side members. The first and second prefilters are mounted within the frame. The first prefilter is disposed to one side of both screens and the second prefilter is disposed on the opposite side of both screens. The invention includes a housing for the gas adsorption bed assembly and a counterflow adsorber module formed by operably connecting the housings end-to-end.

14 Claims, 11 Drawing Sheets

REFILLABLE GAS ADSORPTION BED ASSEMBLY AND COUNTERFLOW ADSORBER MODULE

TECHNICAL FIELD

The present invention pertains generally to a filtering apparatus for removing gaseous contaminant from clean rooms, sick buildings, or other enclosed spaces.

BACKGROUND OF THE INVENTION

Gas adsorption beds are used in many industries to remove gaseous contaminant from the air to protect people, the environment and, in many cases, a manufacturing process. Gas adsorption beds are also used in sick buildings and other enclosed spaces.

One specific application of gas adsorption beds is in the semiconductor industry where product is manufactured in an ultra-clean air environment, commonly known as a clean room. Invariably, a manufacturing process will require the use of a solvent or an aerosol to be used in the clean-room environment. This presents a problem because gaseous contaminant coming from the process will contaminate the air and other processes in the room. To eliminate the problem, the contaminated air is drawn through a granular adsorption bed assembly having a frame and a bed of adsorption medium, such as activated carbon, disposed within the frame. The adsorption medium adsorbs the gaseous contaminant from the airstream and allows the clean air to be returned to the room.

The removal efficiency and holding capacity of a gaseous adsorption bed is dependent upon a number of factors, such as the air velocity through the adsorption bed, the depth of the adsorption bed, the type and amount of adsorption medium used, and the activity level of the adsorption medium. One other significant factor that effects adsorption efficiency is the amount of contaminated air that can leak through voids between the adsorption bed and the frame, and leak through frame joints. It is also desirable to promote even deterioration or wear of the activated gas adsorption bed by equally distributing the flow of air incident the adsorption bed across its cross-sectional area. Further, if more than one gas adsorption bed is used in an installation, it is desirable to deliver equal amounts of contaminated air to each adsorption bed so that they will wear or deteriorate at approximately the same rate.

SUMMARY OF THE INVENTION

The present invention pertains to a refillable gas adsorption bed assembly comprising a box-like, generally rectangular frame having a pair of oppositely disposed side members and a pair of oppositely disposed end members. The adsorption bed assembly also includes first and second rectangular fine mesh screens mounted within the frame on opposite sides of a filler opening through one of the members. Each screen has a peripheral edge. There is a means provided for sealably connecting the peripheral edge of each screen to the frame.

First and second prefilters are mounted within the frame. The first prefilter is disposed to one side of both screens, and the second prefilter is disposed on the opposite side of both screens. Each prefilter has a peripheral edge. Means for sealably connecting the prefilter to the frame is provided.

A bed of gas adsorption granules is disposed between the screens and the members. A removable cover means is provided for covering the opening in one of the members.

The present invention also includes a housing for an air filter assembly. The housing includes a generally rectangular frame having a pair of oppositely disposed side members. The frame has an opening in at least one of the side members for receiving the gas adsorption bed assembly.

First and second internal partitions extend between two of the side members. The first partition is disposed within the frame proximate and parallel to a first side member to form an axially extending inlet plenum therebetween. The second partition is disposed within the frame parallel to the first partition, and proximate and parallel to a second side member to form an axially extending outlet plenum therebetween. An adsorption bed chamber is disposed between the first partition and the second partition.

The housing also includes a sealing means for sealably receiving the adsorption bed assembly disposed within the adsorption bed chamber. The sealing means divides the adsorption bed chamber to form an inlet chamber on one axially disposed end of the sealing means, and an outlet chamber on the opposite axially disposed end of the sealing means.

There is provided an oblique flow inlet through the first partition, and an outlet through the second partition, whereby air entering the axially extending inlet plenum can flow through the flow inlet, the inlet chamber, the adsorption bed assembly, the outlet chamber, and the flow outlet to the axially extending outlet plenum.

Two or more housings may be operably connected end-to-end to form a counterflow adsorber module. To form the adsorber module, the inlet plenum and the outlet plenum of each housing are axially aligned with each other to form an elongated inlet and an elongated outlet plenum, respectively. Proximate an axially disposed end of the housings is a first plate operably connected to the end. The first plate covers the elongated inlet and outlet plenums and the adsorption bed chamber. Proximate an opposite axially disposed end of the housing is a second plate operably connected to the opposite end. The second plate covers the adsorption bed chamber so that air entering the elongated inlet plenum divides to flow at approximately equal rates through each of the adsorption bed chambers.

DETAILED DESCRIPTION OF THE PREFERRED EMBODIMENT

Figure 1:
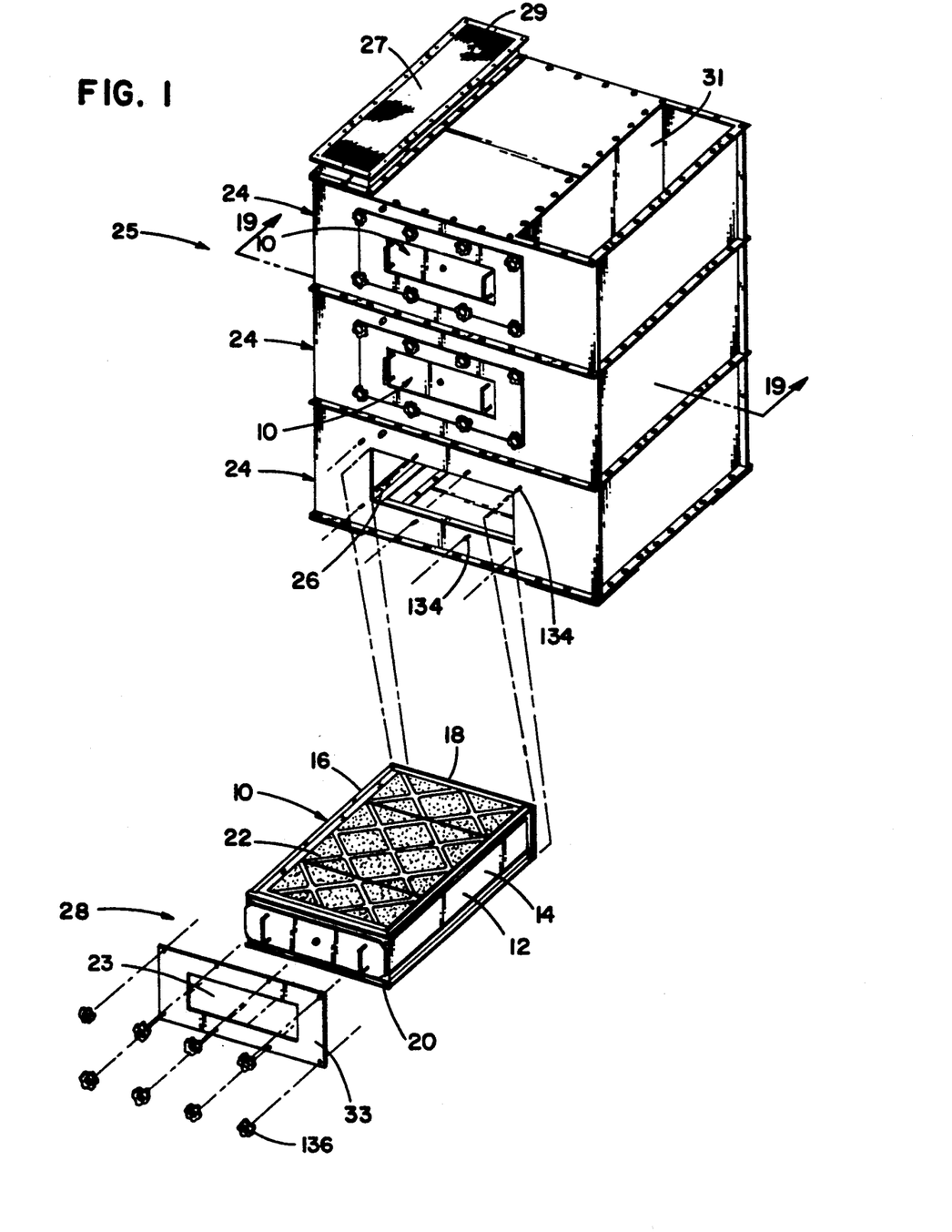
FIG. 1 shows a perspective view of a refillable adsorption bed assembly, in accordance with the present invention, and a perspective view of a counterflow adsorber module, in accordance with the present invention.

Referring now to the drawings wherein like reference numerals designate identical or corresponding parts throughout the several views, FIG. 1 shows a rigid, easily sealable and refillable adsorption bed assembly, generally referred to by the numeral 10. Adsorption bed assembly 10 has a box-like, generally rectangular frame 12 having a pair of oppositely disposed side members 14 and 16 and oppositely disposed end members 18 and 20. Oppositely disposed side members 14 and 16 and oppositely disposed end members 18 and 20 define a fluid passage therethrough. Disposed within the fluid passage is a filter means 22 for filtering fluid passing through the fluid passage.

Also shown in FIG. 1, are three adsorption bed housings 24 stacked end-to-end and operably connected to form a counterflow adsorber module 25. Counterflow adsorber module 25 has a fluid flow inlet 27 shown here fitted with a flow profiler 29, and a fluid flow outlet 31. Each housing 24 has a sealing means 26 for sealably receiving one adsorption bed assembly 10 and a retaining means 28 for retaining adsorption bed assembly 10 within housing 24. Retaining means 28 includes a generally rectangular cover plate 33 having a generally rectangular opening 23.

Figure 2:
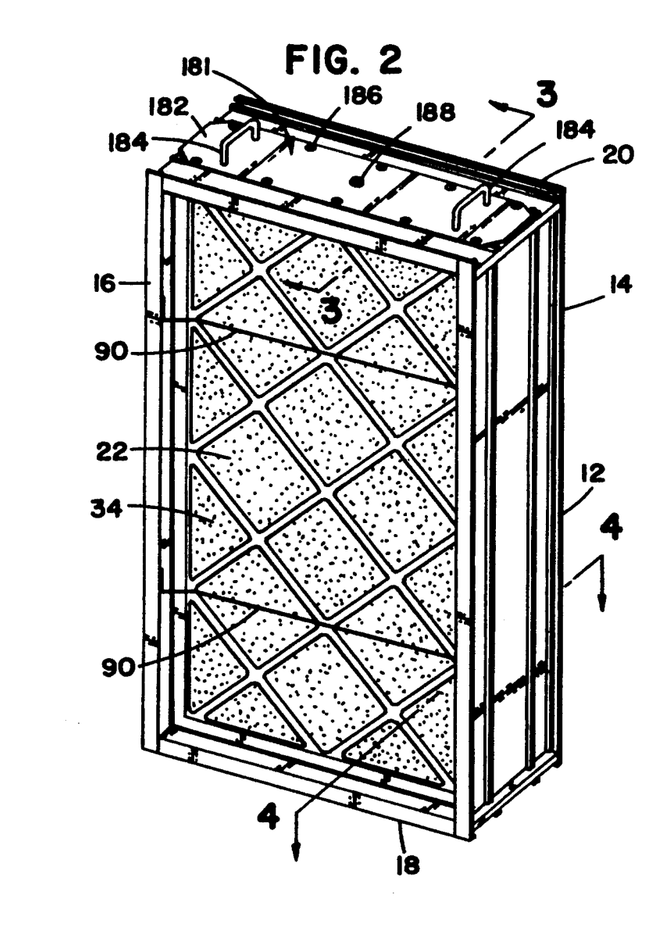
FIG. 2 shows a perspective view of the refillable adsorption bed assembly.
Figure 3:
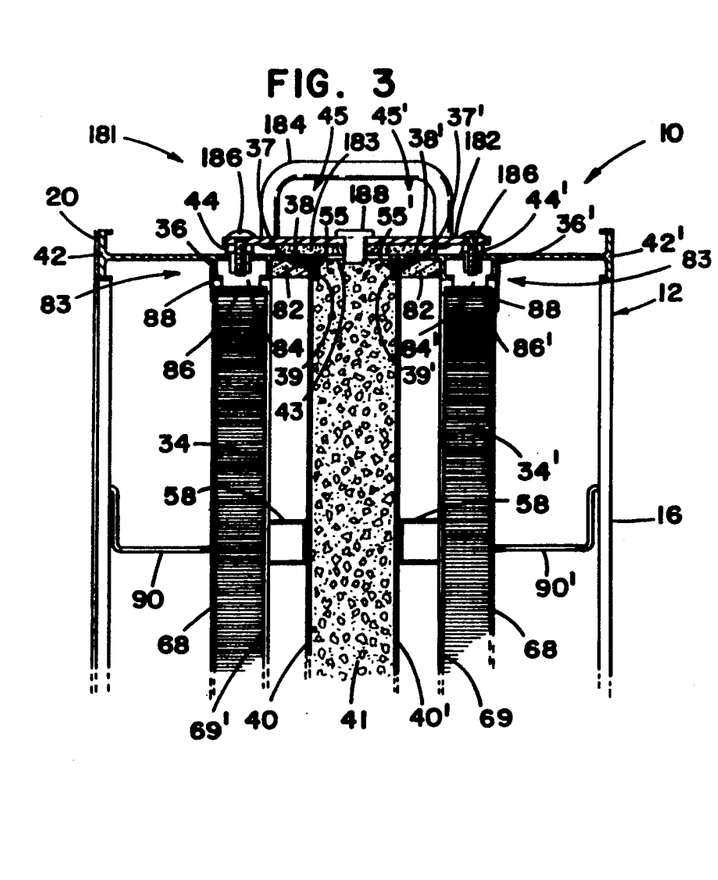
FIG. 3 shows a cross-sectional view of the refillable adsorption bed assembly taken along line 3—3 of FIG. 2.
Figure 4:
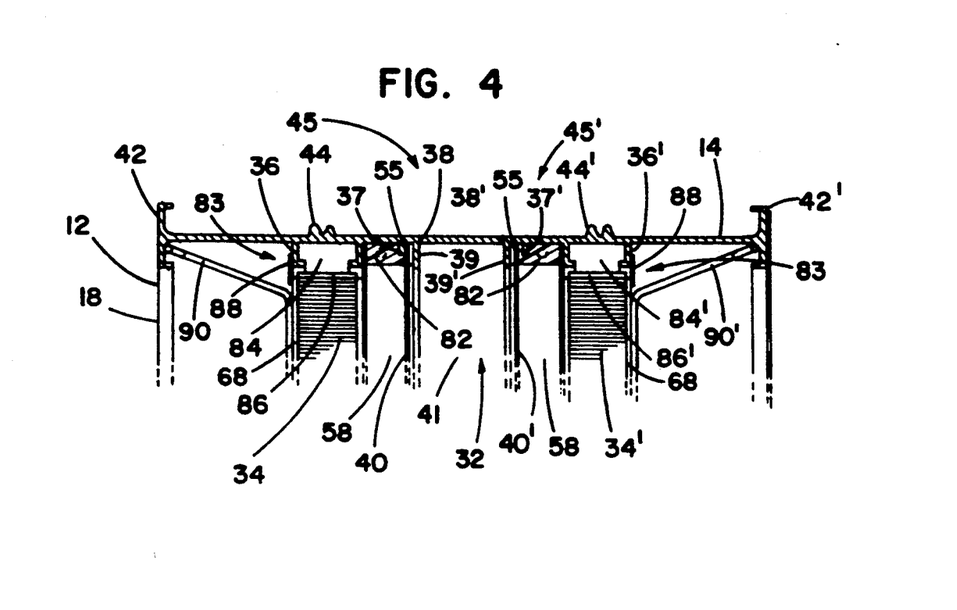
FIG. 4 shows another cross-sectional view of the refillable adsorption bed assembly taken along line 4—4 of FIG. 2.

Referring now to FIGS. 2 through 4, FIG. 2 shows refillable adsorption bed assembly 10 having filter means 22 disposed within frame 12. In the preferred embodiment, filter means 22 includes a granular adsorption bed 32 disposed between two prefilters 34 and 34' as shown in FIG. 3.

Side members 14 and 16 and end members 18 and 20 of frame 12, supporting filter means 22, are preferably extruded metal such as an aluminum alloy. Each side member 14 and 16 and each end member 18 and 20 has a plurality of integrally formed longitudinal channels for fastening filter means 22 within frame 12. The channels can vary in size and configuration to accommodate various types of filters and/or adsorption beds, but in the preferred embodiment there are two C-shaped channels 36 and 36' and two J-shaped channels 38 and 38' disposed inwardly from the side members 14 and 16 and end members 18 and 20. J-shaped channels 38 and 38' have a short portion 37 and 37' and a long portion 39 and 39', respectively. C-shaped channel 36 on side members 14 and 16 and end members 18 and 20 are coplanar. C-shaped channels 36' and J-shaped channels 38 and 38' on side members 14 and 16 and end members 18 and 20 are also disposed in respective coplanar relationship. C-shaped channels 36 and 36' are configured to receive prefilters 34 and 34' respectively and J-shaped channels 38 and 38' are configured to receive screens 40 and 40', respectively, of adsorption bed 32.

In the preferred embodiment, each side member 14 and 16, and end member 18 and 20 has a pair of oppositely disposed longitudinally extending flanges 42 and 42' which contribute rigidity and strength to the respective side members 14 and 16 and end members 18 and 20. Each side member 14, 16 and end member 18, 20 also has two small longitudinally extending, outwardly disposed C-shaped channels 44 and 44'. Channels 44 and 44' also contribute structural strength and rigidity to side members 14 and 16 and end members 18 and 20.

Figure 5:
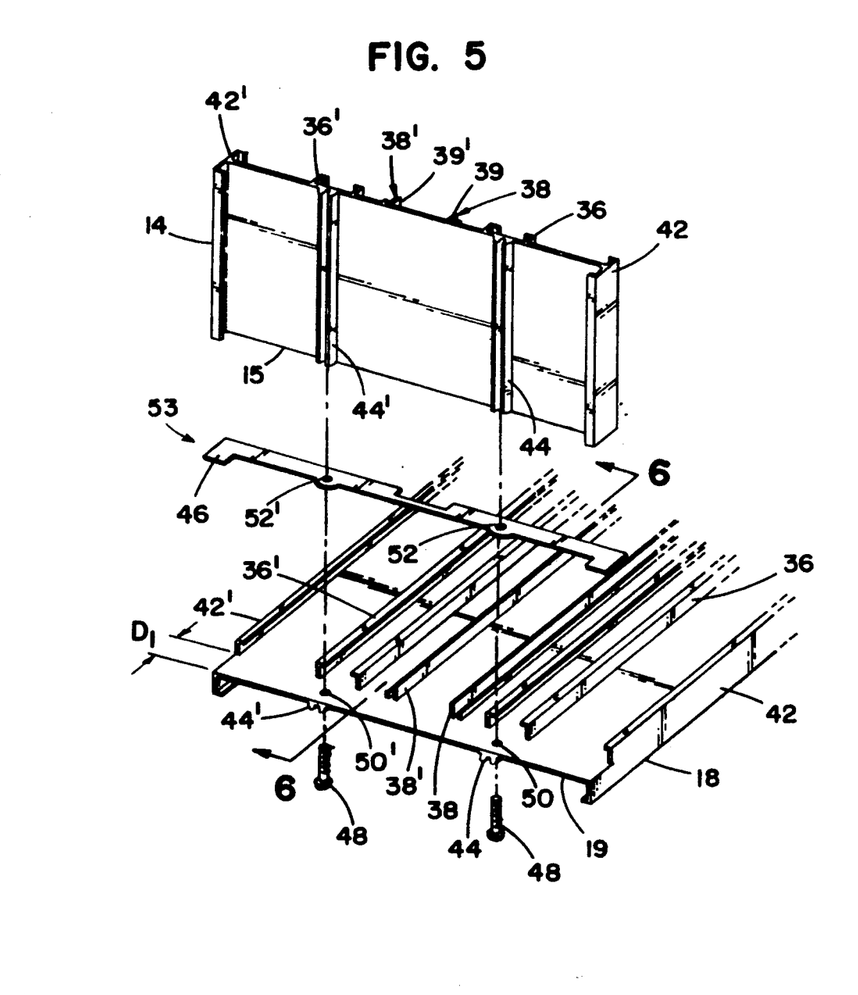
FIG. 5 shows an exploded perspective view of a corner assembly of the refillable adsorption bed assembly.
Figure 6:
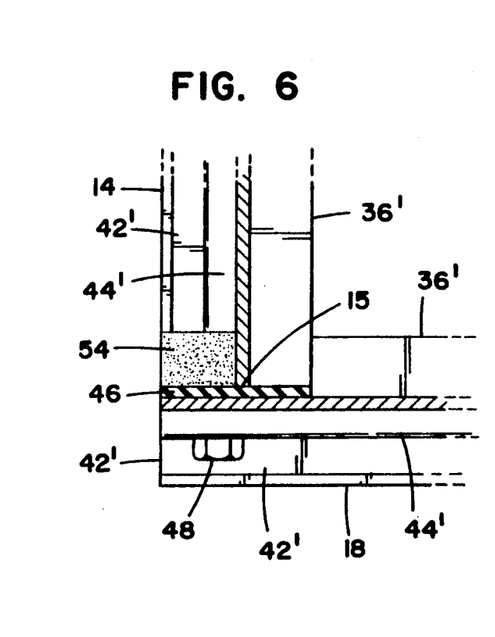
FIG. 6 shows a cross-sectional view of the corner assembly taken along line 6—6 of FIG. 5.

Referring now to FIGS. 5 and 6, FIG. 5 shows an exploded view of a typical corner assembly of frame 12, in particular, the corner formed with side member 14 and end member 18. The remaining three corners are essentially similar. As shown in FIG. 5, C-shaped channels 36 and 36', J-shaped channels 38 and 38', and those portions of flanges 42 and 42' disposed inwardly are terminated a distance $D_1$ from an end 19 of end member 18. The C-shaped channels 36 and 36' and J-shaped channels 38 and 38' and flanges 42 and 42' on side member 14 are continuous to an end 15 of side member 14. In the preferred embodiment C-shaped channels 36 and 36', longer portions 39 and 39' of J-shaped channels 38 and 38' respectively, and flanges 42 and 42' extend inwardly an equal distance. Thus, C-shaped channels 36 and 36', long portions 39 and 39', and flanges 42 and 42' on side member 14 will abut the ends of the corresponding coplanar channels and flanges on end member 18 terminated distance $D_1$ from end 19.

A fastening means 53 for sealably connecting side member 14 to end member 18, including a suitable gasket 46, is placed between end 15 of side member 14 and end member 18 to create a gas-tight seal. Member 14 is then preferably fastened to member 18 with threaded fasteners 48 and 48' extending through openings 50 and 50' in end member 18, through openings 52 and 52' in gasket 46, and threaded into small C-shaped channels 44 and 44' of side member 14. As shown in FIG. 6 an epoxy sealant 54 is deposited outwardly proximate a point of contact between end 15 of side member 14 and gasket 46 to enhance the integrity of the seal and structural strength of frame 12.

Figure 7:
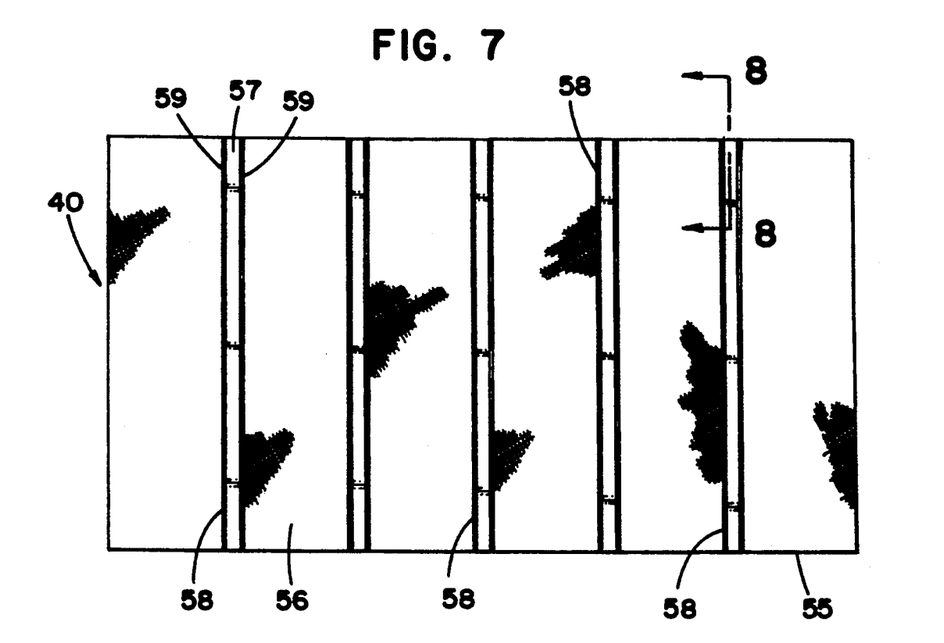
FIG. 7 shows a screen for an adsorption bed.
Figure 8:
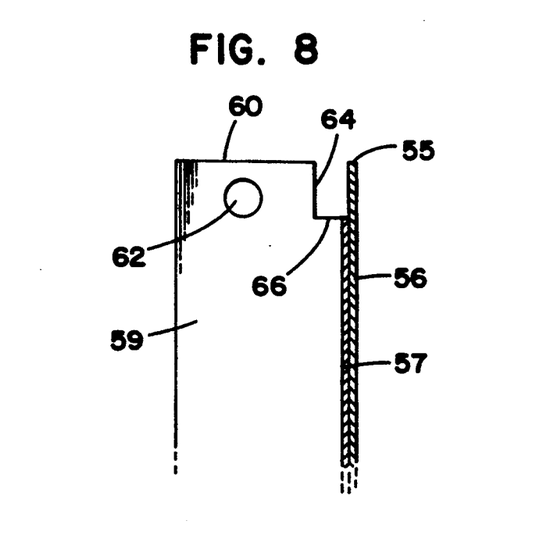
FIG. 8 shows a cross-sectional view of the screen taken along line 8—8 of FIG. 7.

Referring now to FIGS. 7 and 8, FIG. 7 shows a front view of a screen 40. Screen 40 includes a generally rectangular portion of wire mesh 56, such as 20×20 ss wire mesh. Screen 40 also includes a plurality of U-channels 58 disposed and fastened to one side of wire mesh portion 56. Each U-channel 58 has a base portion 57 operably connecting two oppositely disposed side members 59.

FIG. 8 shows a typical end 60 of U-channel 58. As shown in FIG. 8, base 57 of U-channels 58 is fastened to wire mesh portion 56. U-channel 58 may be fastened to wire mesh portion 56 by spot welding. Proximate end 60 of U-channel 58 is an opening 62 in side member 59.

The opposite side member 59 also has a similarly positioned opening. Side members 59 have a notch 64 proximate end 60 of U-channel 58, having base 66. Base member 57 of U-channel 59 ends at the base 66 of notch 64. Wire mesh portion 56 has a peripheral edge 55 proximately aligned with end 60 of U-channel 58.

Figure 9:
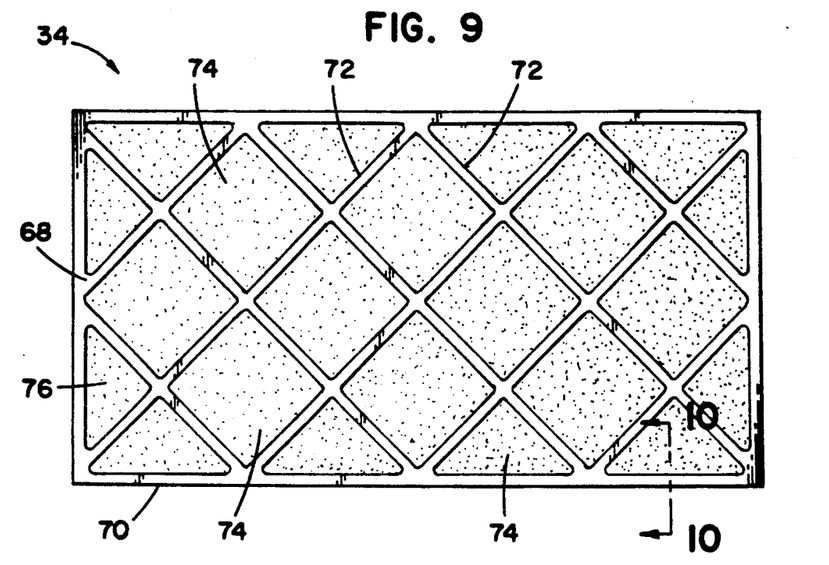
FIG. 9 shows a front view of a prefilter.
Figure 10:
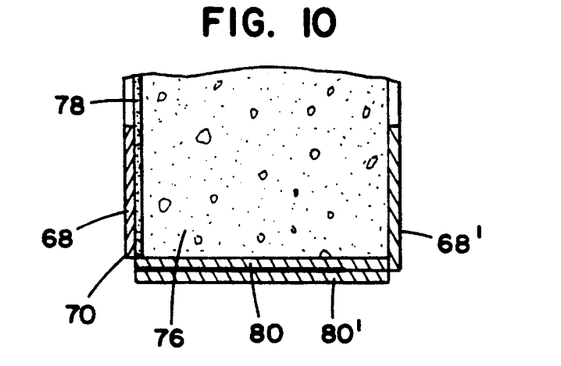
FIG. 10 shows a cross-sectional view of the prefilter taken along line 10—10 of FIG. 9.
Figure 11:
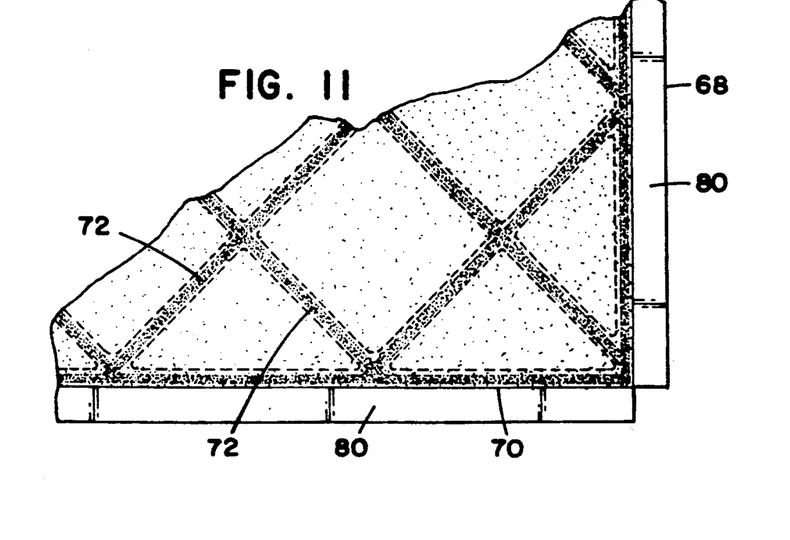
FIG. 11 shows a polypropylene filter heat bonded to a chipboard frame of the prefilter.

Referring now to FIGS. 9 through 11, FIG. 9 shows a front view of prefilter 34. Prefilter 34' is essentially similar. Prefilter 34 has a generally rectangular first chipboard frame 68 and a similar generally rectangular second chipboard frame 68'. Frames 68 and 68' are preferably clay coated on both sides. Disposed between frames 68 and 68' is preferably an electret filter, for example a polypropylene filter 78, bonded to frame 68 and a non-woven polypropylene filter pad 76 disposed between polypropylene filter 78 and frame 68'.

For convenience, the elements of chipboard frame 68' will be discussed by reference to the chipboard frame 68. Chipboard frame 68 has a generally rectangular periphery 70 and a plurality of diagonal chipboard members 72 disposed within periphery 70. Between diagonal members 72 are a plurality of openings 74. The polypropylene filter 78 is preferably heat bonded to the diagonal members 72 and periphery 70 of first chipboard frame 68 as shown in FIG. 11. In the preferred embodiment, first chipboard frame 68 is operably connected to second chipboard frame 68' by adhering overlapping flaps 80 and 80' of frames 68 and 68', respectively, together by a method well known in the art.

Referring now to FIGS. 2 through 4, FIG. 3 shows a cross-section of adsorption bed assembly 10. Screens 40 and 40' are shown disposed with frame 12. Peripheral edge 55 of screen 40 is disposed between short portion 37 and long portion 39 of J-shaped channel 38. A means 45 for sealably connecting peripheral edge 55 to frame 12, including an epoxy sealant 82 deposited between long portion 39 of J-shaped channel 38 and C-shaped channel 36 imbeds peripheral edge 55 of wire mesh portion 56 to create a continuous seal between end portion 20 and screen 40. An essentially similar seal is created between screen 40 and end member 18, side member 16, and side member 14 as shown in FIG. 4. The other screen 40 is held in frame 12 in an essentially similar manner proximate channel 38' with epoxy 82' imbedding peripheral edge 55'.

Disposed between screens 40 and 40' is a bed of gas adsorption granules 41, such as activated carbon granules, zeolites, sodium bisulfide, silica or other media. Access to bed 41 is obtained through an opening 43, also disposed between screens 40 and 40', in end member 20. Opening 43 is sealed with a removable cover means 181, including a cover plate 182 having two outwardly extending C-shaped handles 184. Disposed between cover plate 182 is a suitable gasket 183, preferably made of EPDM or other suitable material to form a gas-tight seal over opening 43. Cover plate 182 is fastened to end member 20, preferably with suitable threaded fasteners 186. Extending through cover plate 182 is a tapped hole for accepting a sampling probe, the tapped hole has a screw cap 188.

As an alternative to gas adsorption granules 41, other gas adsorption structures or media can be used, including adsorbent fibrous sheets such as activated carbon sheets. Such sheet structures can be configured for gas adsorption with flow through or over the sheets. If flow through pleated fibrous sheets are used, then the gas adsorbing fibers can also double as a filter. Also, a dual or composite pleated structure can be formed with an improved fibrous filter structure followed by a fibrous adsorber structure.

FIG. 3 also shows prefilters 34 and 34' disposed within frame 12. Means 83, for sealably connecting prefilters 34 and 34' to frame 12, includes within and extending from each C-channel 36 and 36' seals 84 and 84', respectively, which are preferably double-faced acrylic tape. Seals 84 and 84' abutting edges 86 and 86' of prefilters 34 and 34', respectively, to create a seal between prefilters 34 and 34', and end member 20. An essentially similar seal extends along end member 18, side member 16, and side member 14 as shown in FIG. 4. First chipboard frame 68 of prefilters 34 and 34' are taped to C-shaped channels 36 and 36', respectively, with tape 88 to enhance the seal between prefilters 34 and 34', and frame 12. Tape 88 extends continuously along channels 36 and 36', as shown in FIGS. 3 and 4.

Prefilter 34 is biased toward U-channels 58 of screen 40 by at least one biasing means 90 for biasing prefilter 34 toward U-channel 58. At least one other biasing means 90' biases prefilter 34' toward U-channels 58 of screen 40'.

Figure 12:
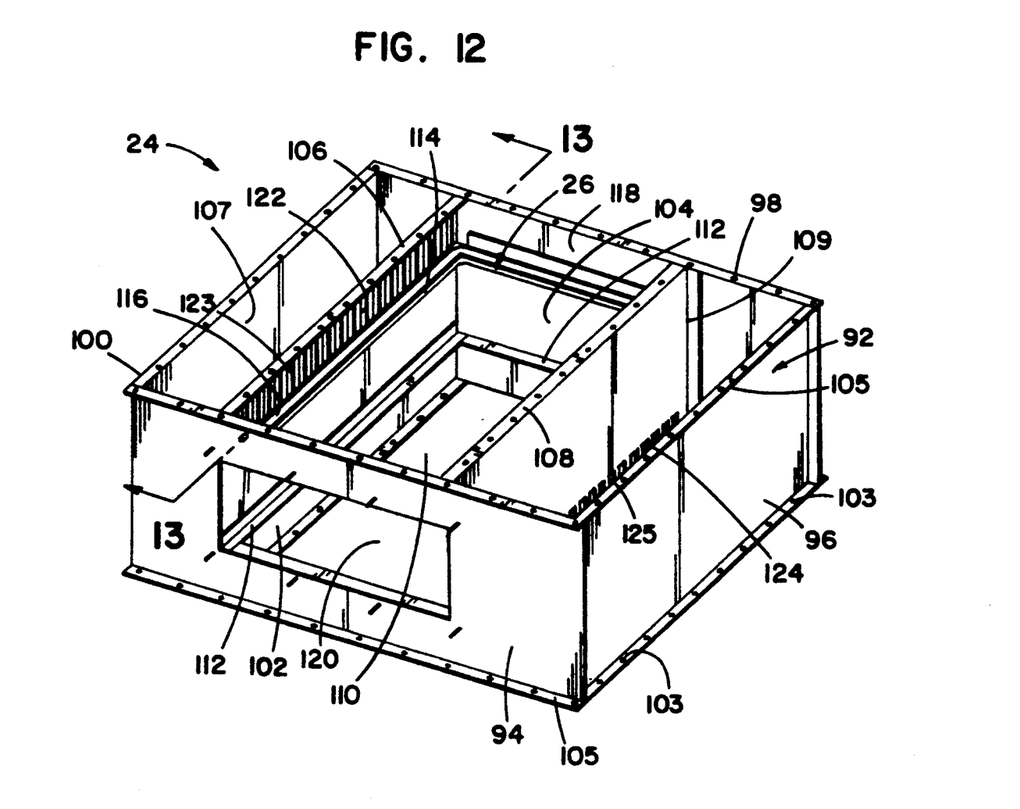
FIG. 12 shows a housing for the refillable adsorption bed assembly.
Figure 13:
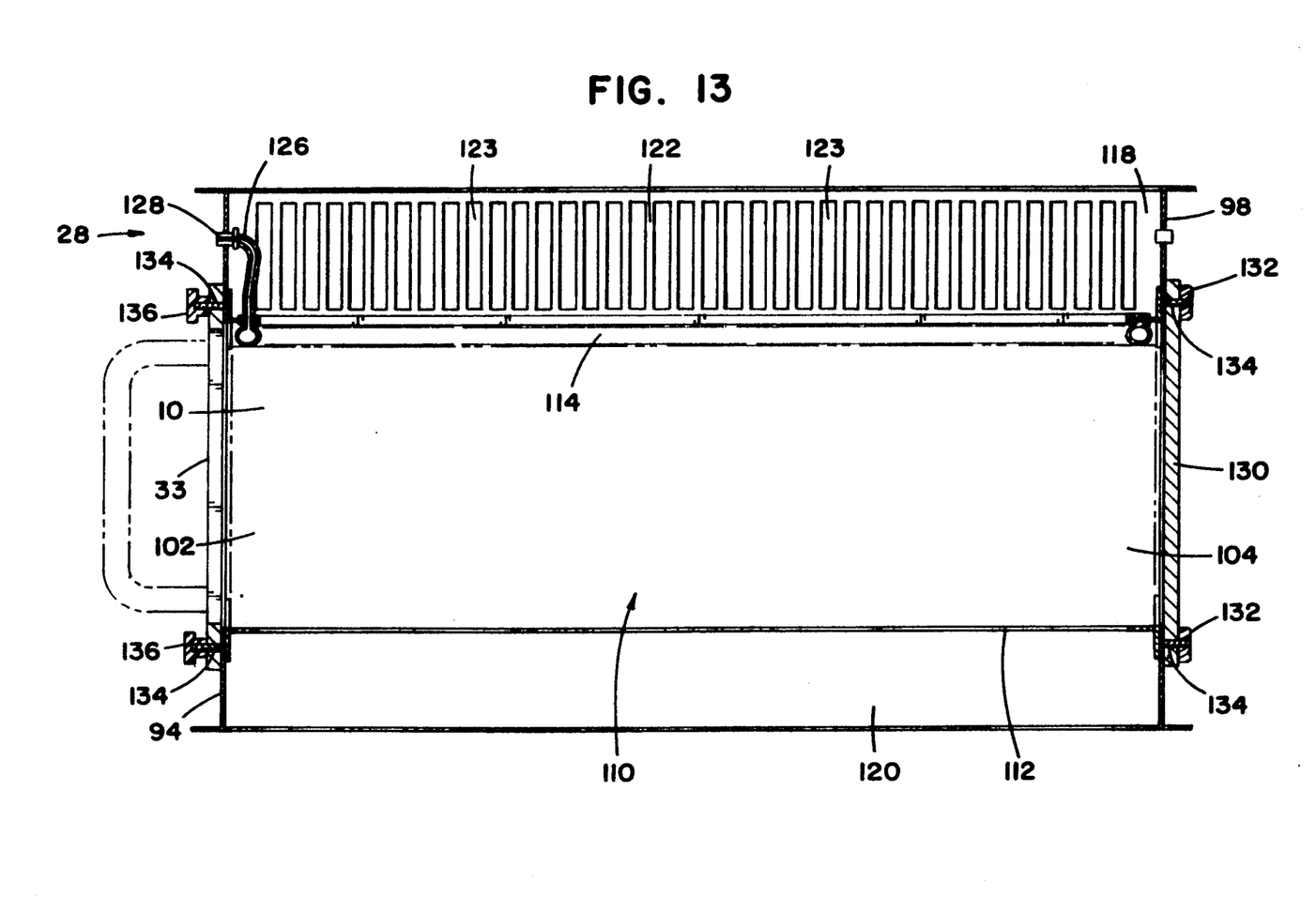
FIG. 13 shows a cross-sectional view of the housing taken along line 13—13 of FIG. 12.

Now referring to FIGS. 12 and 13, FIG. 12 shows a perspective view of housing 24 for adsorption bed assembly 10. Housing 24 has a generally rectangular frame 92 having a pair of oppositely disposed sides 94 and 98, and 96 and 100. Side members 94 and 98 each have generally rectangular openings 102 and 104, respectively. Within frame 92 is a first internal partition 106 disposed proximate and parallel side 100 to form an axially extending inlet plenum 107 between partition 106 and sides 94, 98 and 100. Disposed proximate and parallel side 96 is a second internal partition 108 forming an outlet plenum 109 between internal partition 108 and sides 94, 96 and 98. First internal partition 106 is disposed to one side of openings 102 and 104 and second internal partition 108 is disposed to the opposite sides of openings 102 and 104 to form an adsorption bed 110 between internal partitions 106 and 108 and sides 94 and 98.

Disposed within adsorption bed chamber 110 is sealing means 26 for sealably receiving refillable adsorption bed assembly 10. Sealing means 26 includes an inflatable gasket 114 disposed proximate a first axially disposed end of openings 102 and 104 as shown in FIG. 12. Sealing means 26 also includes a flange 112 proximate a second axially disposed end of openings 102 and 104, as shown in FIG. 12. Gasket 114 is mounted on a flange 116.

Sealing means 26 divides adsorption bed chamber 110 to form an inlet chamber 118, disposed on a first axially disposed end of housing 24 and an outlet chamber 120 on the second and opposite axially disposed end of the housing 24. As shown in FIG. 12, inlet chamber 118 is above gasket 114 and outlet chamber 120 is below flange 112.

An oblique flow inlet 122, including a plurality of axially extending openings 123, extends from inlet plenum 107 to inlet chamber 118. An oblique flow outlet 124, including a plurality of axially extending openings 125, extends from outlet chamber 120 to outlet plenum 109.

On opposite axially disposed ends of housing 24 are flanges 105 extending along and disposed approximately perpendicularly to sides 94, 96, 98, and 100, and internal partitions 106 and 108. Flanges 105 have a plurality of apertures 103 extending therethrough.

FIG. 13 shows a cross-section of housing 24 taken through adsorption bed chamber 110. An adsorption bed assembly 10 is shown schematically within adsorption bed chamber 110. Adsorption bed assembly 10 is supported by flange 112 and inflatable gasket 114 is shown inflated to abut against adsorption bed assembly 10 (specifically gasket 114 abuts against flanges 42 and 42' of frame 12). A tube 126 extends from inflatable gasket 114 to a coupling and pressure seal 128.

Opening 104 is covered with a solid plate 130 fastened to side 98 by nuts 132 threaded onto pins 134 extending from side 98. Disposed on side 94 of housing 24 is retaining means 28 for retaining adsorption bed assembly 10 within housing 24. Retaining means 28 includes plate 33 which is fastened to side 94 with finger-tightening nuts 136 threaded onto pins 134 extending from side 94. It should be appreciated that plate 130 could be fastened with nuts 132 to side 94 and plate 33 could be fastened to side 98 with finger-tightening nuts 136. In this configuration, adsorption bed assembly 10 would be rotated axially 180°.

Figure 14:
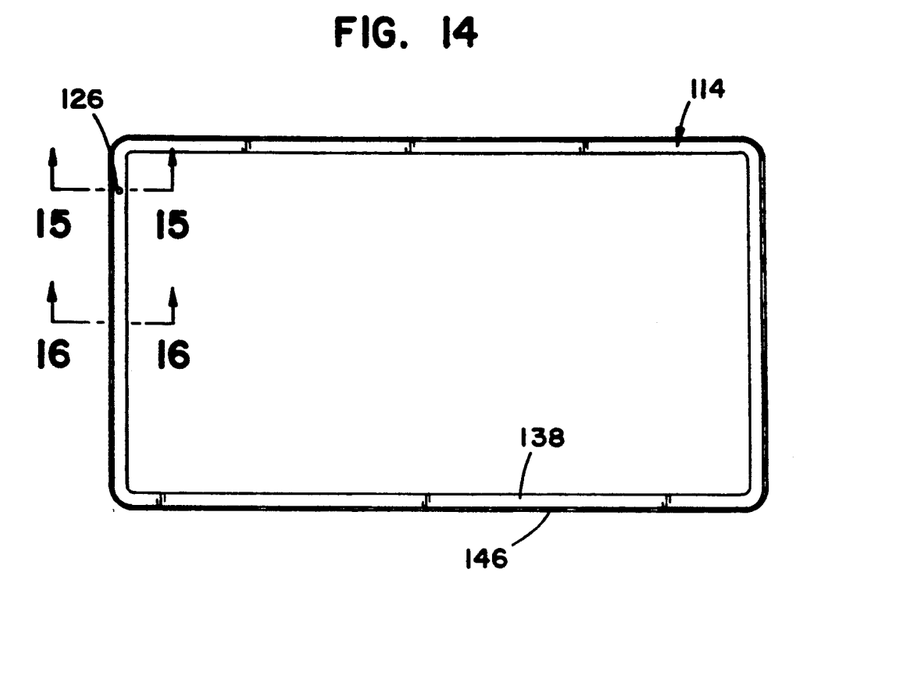
FIG. 14 shows an inflatable gasket for sealing the refillable adsorption bed assembly in the housing.
Figure 15:
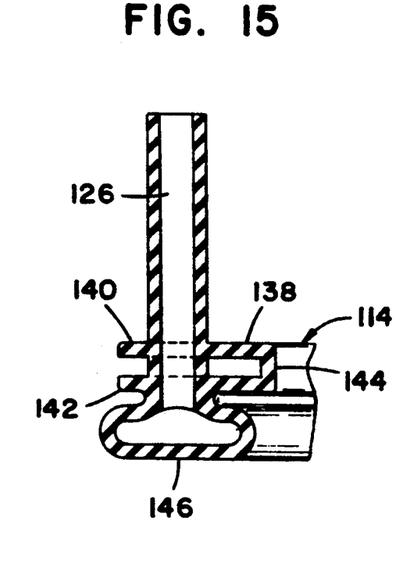
FIG. 15 shows a cross-sectional view of the gasket taken along line 15—15 of FIG. 14.
Figure 16:
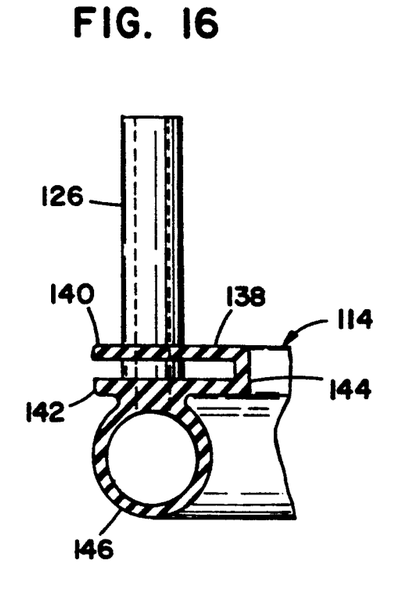
FIG. 16 shows a cross-sectional view of the gasket taken along line 16—16 of FIG. 14.

Now referring to FIGS. 14 through 16, FIG. 14 shows a view of inflatable gasket 114 having a generally rectangular shape corresponding proximately in length and width with frame 12 of filter assembly 10. Tube 126 is also shown.

FIG. 15 shows a cross-section of inflatable gasket 114 taken through tube 126. Inflatable gasket 114 has a flange receiving means 138 for mounting inflatable gasket 114 to flange 116. Flange receiving means 114 has a first side 140 and a second side 142 disposed opposite and parallel to first side 140. First side 140 and second side 142 are operably connected by an end member 144. Operably connected to second side 142 of flange receiving means 138 is a bladder 146. In FIG. 15, bladder 146 is shown in a first disinflated position. In FIG. 16, bladder 146 is shown in a second inflated position. Gasket 114 shown in FIG. 14 is in the disinflated position.

Figure 17:
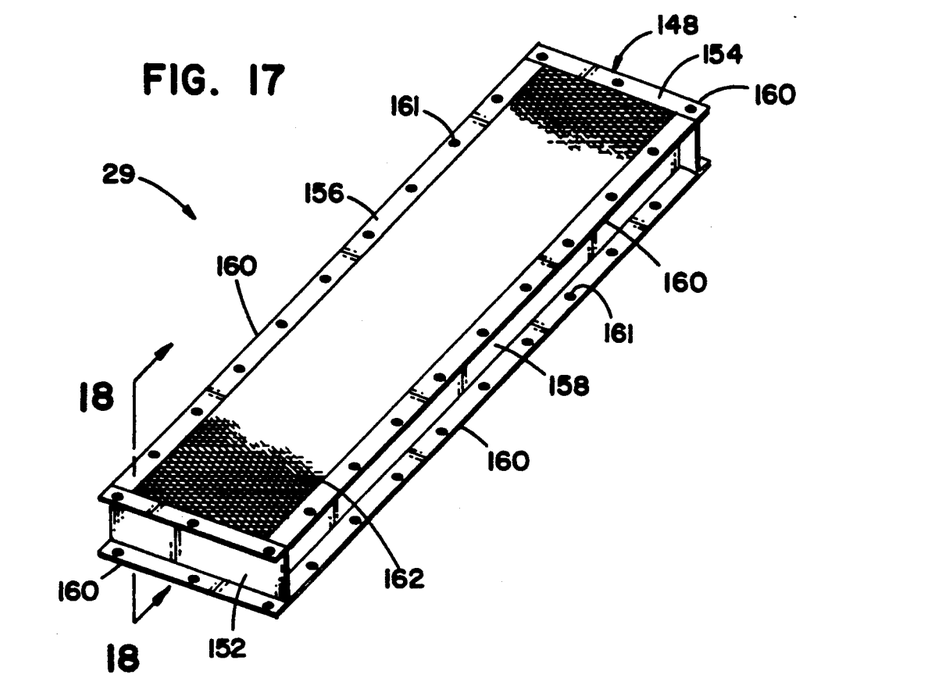
FIG. 17 shows a perspective view of the inlet flow profiler.
Figure 18:
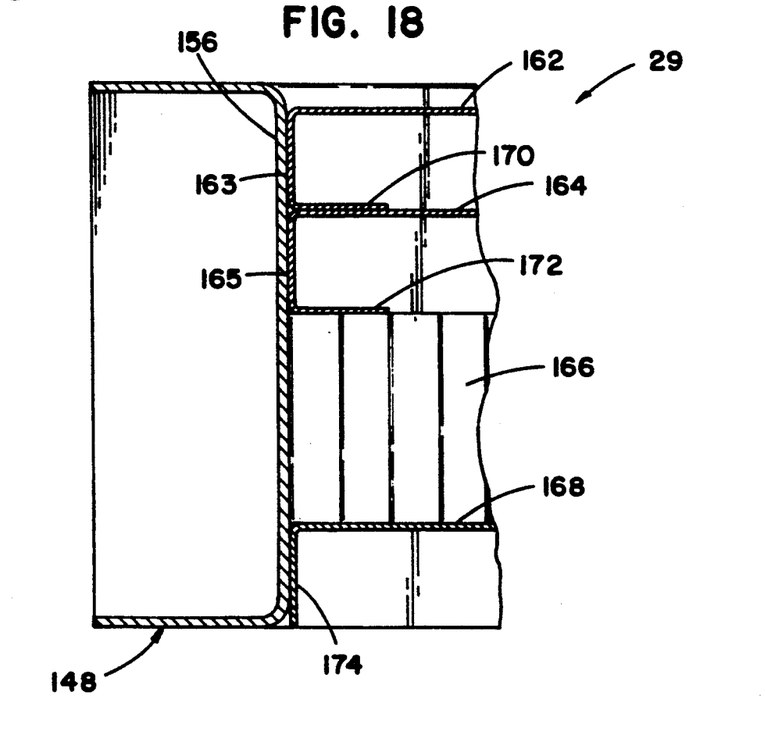
FIG. 18 shows a cross-sectional view of the flow profiler taken along line 18—18 of FIG. 17.

Now referring to FIGS. 17 and 18, FIG. 17 shows a perspective view of flow profiler 29. Flow profiler 29 includes a generally rectangular frame 148 having a pair of oppositely disposed sides 152 and 154, and 156 and 158. Each side 152, 154, 156, and 158 is preferably formed with a channel member having oppositely disposed longitudinal flanges 160. Flanges 160 are preferably disposed outwardly from frame 148 and have a plurality of apertures 161 extending therethrough.

Disposed within frame 148, as shown in FIG. 18, are a first sheet of wire mesh 162, a second sheet of wire mesh 164, a honey comb sheet 166, and a third sheet of wire mesh 168. In the preferred embodiment, the peripheral ends of sheets 162 and 164 are folded over twice to create channel shaped ends having webs 163 and 165 respectively and flanges 170 and 172 respectively. A peripheral edge of third sheet of wire mesh 168 is folded over once to form a flange 174.

In the preferred embodiment, the honeycomb is sized so that honeycomb sheet 166 operates in the laminar flow regime (Reynolds number in the honeycomb cell less than 2000) and has a cell length to diameter ratio of between 5:10 to eliminate swirl components. Wire meshes 162, 164 and 168 are selected so that the overall loss coefficient based on approach dynamic pressure is equal to the square of the ratio of anticipated maximum distorted velocity to the mean duct velocity. Preferably, each sheet of wire mesh 162, 164 and 168 provides ⅓ of the overall loss. Each sheet 162, 164 and 168 is preferably spaced approximately ≧5 mesh opening diameters apart so they do not interact.

Third sheet 168 of wire mesh is disposed at a second axially disposed end of frame 148, as shown in FIG. 18. Flange 174 of third sheet 168 is fastened to frame 148. Honey comb sheet 166 is disposed between sheet 168 and flange 172 of second sheet 164. Web 165 of second sheet 164 is fastened to frame 148. Flange 170 of first sheet 162 is disposed adjacent second sheet 164. Web 163 of first sheet 162 is fastened to frame 148.

Figure 19:
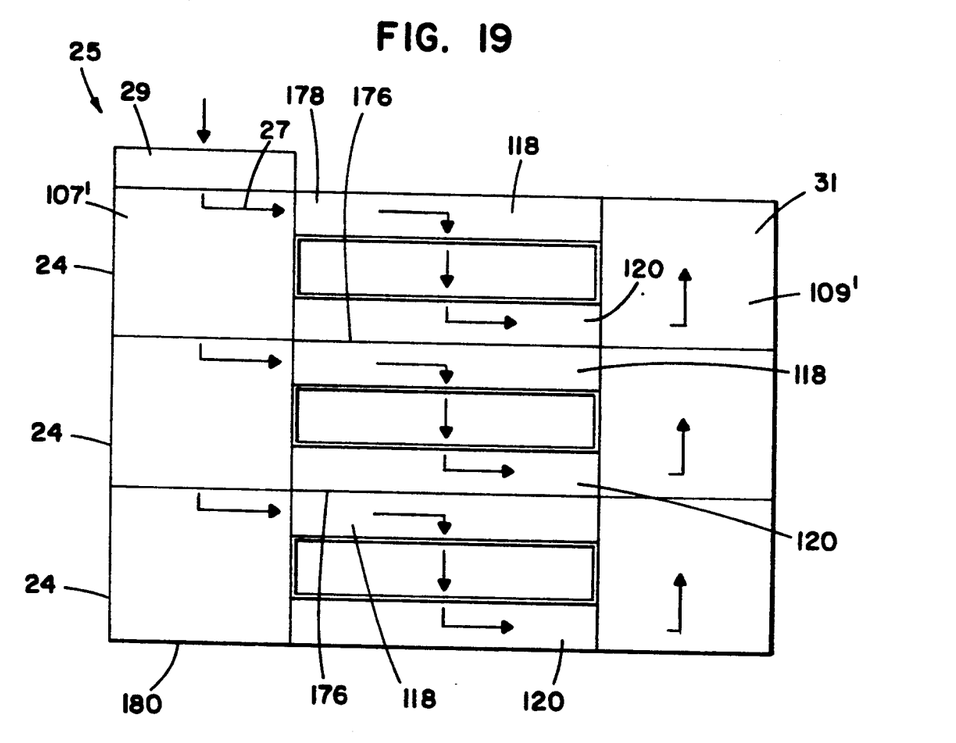
FIG. 19 shows a cross-sectional view of the counterflow adsorber module taken along line 19—19 of FIG. 1.

FIG. 19 shows a schematic cross section of a counterflow adsorber module 25. Counterflow adsorber module 25 includes three housings 24 stacked end-to-end with inlet plenums 107 and outlet plenums 109 of each housing 24 axially aligned with each other, respectively. Although counterflow adsorber module 25 is shown in FIG. 19 including three housings 24, it can be appreciated that one or more housing could be used. Housings 24 are interconnected by threaded fasteners inserted through apertures 103 in flanges 105. By stacking housings 24 in this manner, a continuous inlet plenum 107' and a continuous outlet plenum 109' are formed. A partition 176 must be placed between each inlet chamber 118 and outlet chamber 120 of adjacent housing 24. In the preferred embodiment, partitions 176 are fastened to flanges 105 extending along first internal partition 106 and second internal partition 108, and a portion of sides 94 and 98 disposed between partitions 106 and 108.

Axially disposed to one end of counterflow adsorber module 25 is the inlet 27 and outlet 31 of inlet plenum 107' and outlet plenum 109', respectively. In the preferred embodiment, a flow profiler, such as flow profiler 29 described above, is fastened over the inlet to inlet plenum 107' by aligning apertures 161 of flanges 160 disposed proximate inlet plenum 107' with aperture 103 of flanges 105 disposed proximate inlet 27 of inlet plenum 107'.

Figure 20:
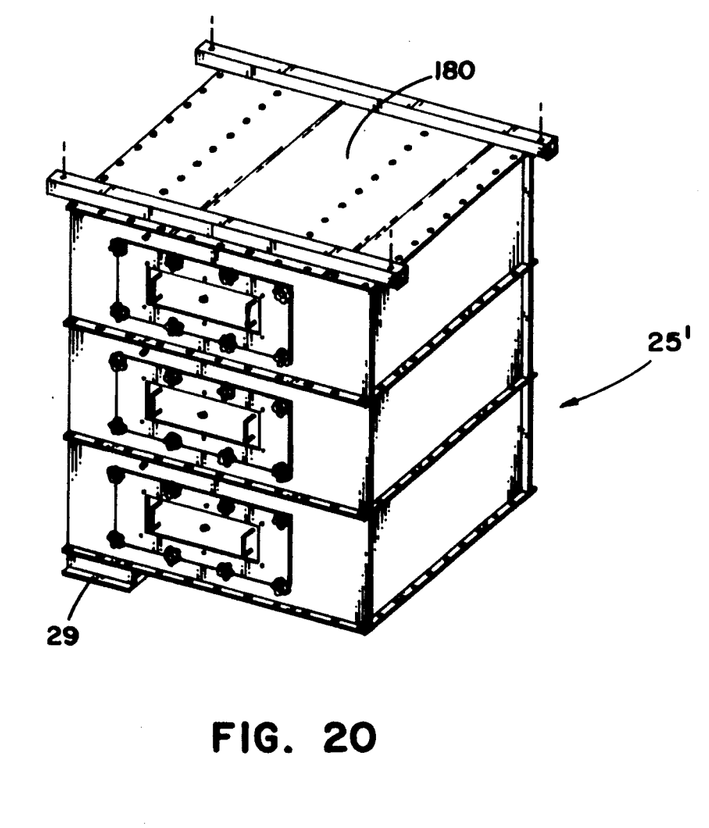
FIG. 20 shows an alternate embodiment of the counterflow adsorber module.

Axially disposed at a first end of counterflow adsorber module 25 is a plate 178 covering inlet chamber 118. Plate 178 is fastened to flanges 105 of housing 24 disposed proximate inlet chamber 118. Covering the entire oppositely disposed axial end of counterflow adsorber module 25 is a plate 180 fastened to proximate flanges 105 of proximate housing 24. It should be appreciated that plate 180 could be fastened to the first axially disposed end of counterflow adsorber module 25, and the inlet 27 and outlet 31 of inlet plenums 107' and 109' be disposed where plate 180 is shown in FIG. 19. Such an alternate embodiment 25' is shown in FIG. 20.

In use, counterflow adsorber module 25 is installed in-line in the ventilation system of a clean room, sick building, or other enclosed space. An incoming ventilation duct is fastened to flow profiler 29 over inlet 27. An outgoing ventilation duct is fastened to outlet 31 in a suitable manner, well known in the art.

Refillable adsorption bed assemblies 10 are sealably installed in housings 24 through openings 102 or, alternately, openings 104. Inflatable gaskets 114 of sealing means 26 are inflated to a second position proximate frames 12, sealing adsorption bed assemblies 10 within housings 24. Inflatable gasket 114 is inflated by forcing air into coupling and pressure seal 128 in a manner analogous to inflating an inner tube. Retaining means 28 is then put in place to retain adsorption bed assemblies 10 within housing 24. This is accomplished by placing plate 33 on pins 134 and threading finger tightening nuts 136 onto pins 134.

Counterflow adsorber module is preferably installed with inlet plenum 107' and outlet plenum 109' in vertical axial alignment. With inlet plenum 107' and outlet plenum 109' aligned in this way, refillable adsorption bed assemblies 10 within housing 24 will be disposed horizontally. It is preferable for adsorption bed assemblies 10 to be disposed horizontally both in transit and in use to avoid settlement of granule bed 41 toward one side member 14 or 16, or end member 18 or 20 of frame 12. Settlement of bed 41 in this manner may cause a gap or space to develop between bed 41 and the frame 12 side or end member opposite the direction of settlement.

As shown in FIG. 19 with flow arrows, air enters counterflow adsorber module 25 through flow profiler 29, passing into inlet plenum 107'. As discussed in more detail below, the relative size of inlet plenum 107' and outlet plenum 109' is such that the flow within inlet plenum 107' divides approximately equally to pass through each oblique flow inlet 122. The approximately equally divided flow then enters each inlet chamber 118 and flows through the proximate filter means 22. As discussed in greater detail below, oblique flow inlet 122 and inlet chamber 118 are designed in such a way that the flow through filter means 22 is approximately equally horizontally distributed. Flow exiting each filter then enters the proximate outlet chamber 120 and passes through oblique flow outlet 124 into outlet plenum 109'. The flow then exits flow adsorber module 25 through outlet 31 and reenters the circulation system.

The approximately equal division of the flow within inlet plenum 107' through oblique flow inlets 122 of each housing 24 can be achieved with a counterflow adsorber module 25 having two or more housings 24 stacked end-to-end. This equal division of flow can also be achieved with inlet 27 and outlet 31 disposed on the opposite axially disposed end of counterflow adsorber module 25, as shown in FIG. 20. The approximately equal division of flow through each oblique flow inlet 122 promotes equal deterioration of each filter means 22.

The key factors which contribute to the approximately equal division of flow through each filter are the flow profiler 29, the relative size of the inlet plenum 107' and outlet plenum 109', and an approximately equal resistance to flow into, through and out of each adsorption bed chamber 110. Flow profiler 29, as described above, tends to equally distribute the flow across the horizontal cross section of inlet plenum 107' in an axially aligned direction. The relative size of the horizontal cross sections of inlet plenum 107' and outlet plenum 109' is determined by the following formula:

$$\frac{A_1}{A_2} = 0.636$$

where $A_1$ is the horizontal cross-sectional area of inlet plenum 107', and $A_2$ is the horizontal cross-sectional area of outlet plenum 109'.

As noted above, the flow through each filter means 22 is distributed approximately equally across its horizontal cross section. The equal distribution of flow across the horizontal cross section of filter means 22 is desirable in order to avoid unequal wear or deterioration.

Elements of the counterflow adsorber module 25 which contribute to the equal distribution of flow across the horizontal cross section of filter means 22 includes the shape of openings 123 of oblique flow inlet 122 and the shape of inlet chamber 118, both as described above. In theory, the shape of inlet chamber 118 could be modified to more equally distribute the flow across the horizontal cross section of filter means 22. This could be accomplished by placing a header within inlet chamber 118 sloping from a point proximate oblique flow inlet 122 and plate 178 or partition 176 to a point proximate filter assembly 10 and outlet plenum 109'.

Over time, bed 41 of refillable adsorption bed assembly 10 installed in counterflow adsorber module 25 will deteriorate and require replacement. The deterioration of bed 41 of gaseous adsorption granules can be measured with a probe inserted through the sampling probe orifice after removing cap 188. The sampling probe samples the gas molecules to be adsorbed, as known in the art.

Once bed 41 of gaseous adsorption granules has deteriorated to a predetermined level, based upon a user's requirements, refillable adsorption bed assembly 10 must be removed from housing 24 in order to replace bed 41. After assembly 10 is removed from housing 24, cover plate 182 is removed to reveal opening 43 in end 20 by unfastening threaded fasteners 86. Bed 41 is then removed. Replacing the bed 41 is accomplished by depositing approximately 6" lifts of gaseous adsorption granules through opening 43. Each lift is then firmly compacted by tamping and vibration before the next lift is deposited.

Prefilters 34 and 34' retaining fine particulates which may be generated by relative movement between granules during shipping and handling. Occasionally, prefilters 34 and 34' may have to be replaced. Preferably their replacement would coincide with the replacement of bed 41. To replace prefilters 34 and 34', biasing means 90 are removed from frame 12. Then, tape 88 is peeled away from C-shaped channels 36 and 36', and prefilters 34 and 34', respectively. New prefilters are installed by reversing these steps.

While the present invention has been described in connection with the preferred embodiment thereof, it will be understood that many modifications will be readily apparent to those skilled in the art, and this application is intended to cover any adaptations or variations thereof. It is manifestly intended this invention be limited only by the claims and equivalents thereof.

What is claimed is:

1. A refillable adsorption bed assembly, comprising:
    a rigid, box-like, generally rectangular extruded metal frame having a pair of oppositely disposed side members and a pair of oppositely disposed end members, said members each having opposite ends;
    said ends of said side and end members being connected at corners of said frame by fastening means and gasket means to prevent air flow therebetween;
    first and second rectangular fine mesh screens mounted within said frame on opposite sides of a filler opening through one of said members, each said side screen having a peripheral edge;
    first and second prefilters mounted within said frame, said first prefilter being disposed to one side of both said screens and said second prefilter being disposed on the opposite side of both said screens, each prefilter having a peripheral edge;
    said members having a plurality of coplanar channels formed therein constructed and arranged to hold said screens and said prefilters;

means for sealably connecting said edges of said prefilters to said frame at a pair of spaced channels;

means including sealant means encapsulating said edges of said screens within a pair of spaced channels;

removable cover means for sealably covering said opening; and a bed of gas adsorption medium disposed in and filling the space between said screens and said members.

2. An adsorption bed assembly, in accordance with claim 1, further comprising said fastening means including a gasket at each corner and a sealant encapsulating said corners.

3. An adsorption bed assembly, in accordance with claim 2, wherein said sealant includes epoxy.

4. An adsorption bed assembly, in accordance with claim 2, further comprising an epoxy sealant used to encapsulate said screen edges in said channels.

5. A refillable adsorption bed assembly, in accordance with claim 1, wherein said prefilters include a non-woven polypropylene mat disposed between operably connected chipboard frames.

6. A refillable adsorption bed assembly, in accordance with claim 1, wherein said cover means is a cover plate having a sampling probe orifice.

7. A refillable adsorption bed assembly according to claim 1 comprising:

said prefilters having a chipboard frame, said frame having at least one opening for allowing fluid to pass through said frame; and a polypropylene filter heat-bonded to said frame to filter fluid passing through said opening.

8. A bed assembly in accordance with claim 7, wherein the frame has a rectangular chipboard periphery and a plurality of diagonal chipboard members disposed within the chipboard frame, and a plurality of openings between the members wherein said polypropylene filter is also heat bonded to said diagonal members.

9. A bed assembly in accordance with claim 7, further comprising a second frame operably connected to said frame and a second non-woven polypropylene filter disposed between said polypropylene filter and said second frame.

10. A housing for a gas adsorption bed assembly, said housing comprising;

a generally rectangular housing frame having a pair of oppositely disposed side members, said frame having an opening in at least one of said side members for receiving said gas adsorption bed assembly;

first and second internal partitions extending between two of said side members, said first partition being disposed within said frame proximate and parallel to a first side member to form an axially extending air inlet plenum therebetween, and said second partition being disposed within said frame parallel to said first partition and proximate and parallel to a second side member to form an axially extending air outlet plenum therebetween and an adsorption bed chamber between said first partition and said second partition;

sealing means for sealably receiving said gas adsorption bed assembly disposed within said adsorption bed chamber and dividing said gas adsorption bed chamber to form an inlet chamber on one axially disposed end of said sealing means and an outlet chamber on the opposite axially disposed end of said sealing means; and an oblique flow inlet into said inlet chamber through said first partition, and a flow outlet from said outlet chamber through said second partition, whereby air entering said axially extending inlet plenum can flow through said flow inlet, said inlet chamber, said gas adsorption bed assembly, said outlet chamber, and said flow outlet to said axially extending outlet plenum.

11. A housing for a gas adsorption bed assembly, in accordance with claim 10, wherein said means for sealably receiving includes an inflatable seal.

12. A housing for a gas adsorption bed assembly, in accordance with claim 10, wherein said oblique flow inlet includes a plurality of proximately parallel elongated openings.

13. At least two housings, in accordance with claim 10, wherein said housings are operably connected so that said inlet plenum and said outlet plenum of each housing are axially aligned with each other to form elongated inlet and outlet plenums, respectively, proximate an axially disposed end of said housings is a first plate operably connected to said end, said first plate covering said elongated inlet and outlet plenums and said gas adsorption bed chamber, and proximate an opposite axially disposed end of said housing is a second plate operably connected to said opposite end, said second plate covering said gas adsorption bed chamber to form a counterflow adsorber module, so that air entering said elongated inlet plenum divides to flow at approximately equal rates through each of said gas adsorption bed chambers.

14. At least two housings, in accordance with claim 13, further comprising a flow profiler disposed at one end of said elongated inlet plenum.

* * * * *